May 3, 1960   L. J. MOULTON ET AL   2,935,045
PARKING MEANS FOR RECIPROCATING, FLUID OPERATED MOTORS
Filed May 28, 1958
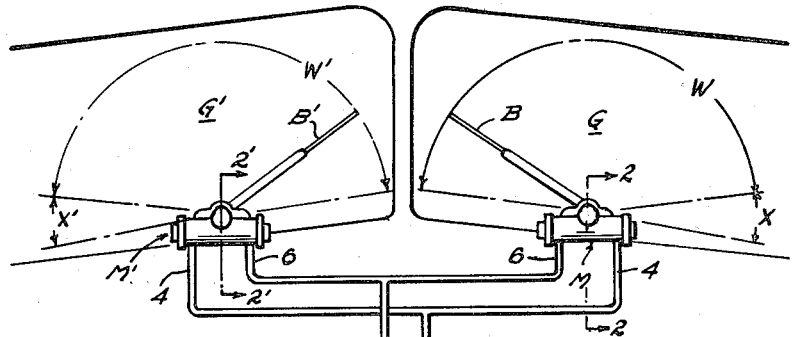
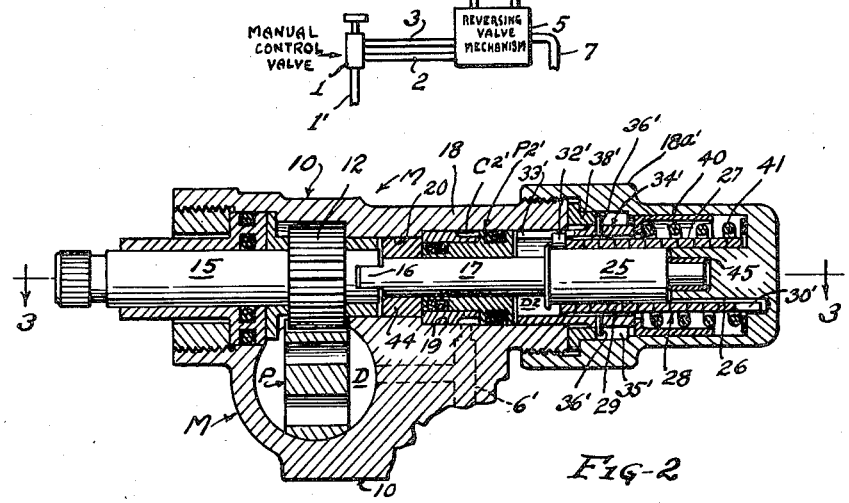
INVENTORS
L. J. MOULTON
R. L. DANGLER
JACK H. EICHLER
By George M. Houel
ATTORNEY

United States Patent Office 2,935,045
Patented May 3, 1960

2,935,045

PARKING MEANS FOR RECIPROCATING, FLUID OPERATED MOTORS

Lloyd J. Moulton, Mentor, Robert L. Dangler, Shaker Heights, and Jack H. Eichler, Chagrin Falls, Ohio, assignors to Curtiss-Wright Corporation, a corporation of Delaware Application May 28, 1958, Serial No. 738,504

5 Claims. (Cl. 121—1)

This invention relates to the above title-indicated mechanisms adapted to lock or latch an output member of a reciprocating fluid operated motor in a suitable terminal stroke position. Thus, if the output comprises for example a wiper blade on a windshield wiper mechanism, the blade will remain in the desired parked position despite strong air current forms or other forces tending to move the blade out of parked position.

In the herewith illustrated form of the invention, output for the motor element to be latched in parked position is shown in the form of a shaft connected to a reciprocating power piston and thereby cyclically oscillated by motions of the piston. The latch mechanism per se, as shown, is a self energizing helical spring brake, the helical spring whereof is anchored to a fixed portion of the motor casing at one end, and coils at the opposite end are releasably frictionally engaged with a drum which is attached to the oscillating wiper drive shaft; and a latch-releasing piston connected for operation by the motor operating fluid system operates through suitable motion converter means to hold the helical spring in a de-energized or drum-releasing position during normal stroke movement of the motor power piston in a direction away from its parking position as will be explained; and, although normally during the next succeeding or return stroke of the power piston the helical brake spring is permitted by the latch releasing piston to return to its one-way braking position, the wiper-associated drum then overruns the associated coils of the helical spring and permits the return stroke movement. At the end of the return stroke the latch releasing piston again operates to de-energize the helical spring unless a purposeful parking operation has been initiated or performed by the attendant or operator, in which latter case no spring de-energizing operation takes place and the power piston is automatically locked in parked position.

Various objects and features of the invention not indicated by the above will become apparent from the following description of the preferred form shown herewith. The essential characteristics are summarized in the claims.

In the accompanying drawing, Fig. 1, is a schematic view showing two wiper motor assemblies, connected by fluid lines in parallel with a pressure-fluid, reversing valve mechanism, and a manually operated control or metering valve for speed control and parking. Fig. 2, is a transverse sectional view of one motor and parking latch mechanism assembly taken, for example, along the line 2—2, or 2'—2' on Fig. 1. Fig. 3 is a schematic partly hydraulic circuit view of an illustrative fluid motor and parking mechanism hereof in a form specifically somewhat different from that of Fig. 2, but operatingly equivalent thereof, being, in part, a cross sectional view as though taken at line 3—3 on Fig. 2.

The wiper and control circuit as generally shown by Fig. 1 may be substantially in accordance with United States Patent to C. R. Sacchini, No. 2,547,145 issued April 3, 1951, but the specific showing given hereby (not fully illustrated) is in accordance with an application in the United States of L. J. Moulton et al., Serial No. 648,007, filed March 25, 1957, both said patent and application being owned by the assignee of the present application.

As shown in the Moulton et al. application the motors or motor assemblies M and M' connected respectively to wiper blades B and B' are supplied with operating fluid for automatic oscillation of the blades by operation of manual control valve 1 to admit aircraft system supply fluid in line 1' to conduits 2 and 3 leading to an automatically operating reversing valve mechanism 5. Over-center, spring loaded means (not shown) in the reversing valve mechanism unit 5 divert fluid from conduit 3 alternately to conduits 4 and 6 which, as shown, are connected respectively in parallel relationship to the motors M and M'. When high pressure fluid at normal wiper operating rate is admitted to the motors through line portions 4 the relatively opposite line portions 6 are connected to a drain 7 via operation of the reversing valve mechanism unit 5.

Parking of the motor power piston P, Figs. 2 and 3, is preferably arranged for operation in accordance with the co-pending application of J. L. Fuller et al., Serial No. 738,503 filed May 28, 1958, owned by the assignee hereof. Therein, when the metering valve 1 is operated to reduce the rate of supply of operating fluid to the motor or motors below the point necessary to produce over-center or automatic fluid reversing operation in the mechanism 5 the blades move out of the area indicated by W and W' and associated broken lines into the areas similarly indicated at X and X' or beyond normal wiper blade operating stroke positions (preferably outboard when the wiper mechanism is serving an aircraft). The wipers B and B' can, of course, instead, be parked at normal terminal stroke positions and no special parking valve control other than control valve 1 is necessary.

Referring to Fig. 3 (or to Fig. 2 which shows essentially the same arrangement as Fig. 3 and wherein corresponding parts are given the same reference characters but primed when characteristically different), power piston P or motor M has its opposite ends or heads 8 and 9 slidably arranged in a cylinder body or main casing or housing 10 which is closed at its ends except for connection with the supply and exhaust passages 4 and 6 leading to pressure chambers C' and C respectively. The piston heads 8 and 9 are rigidly connected by a rack 11 which through a pinion 12 drives the output shaft 15 connected, for example, to wiper B, Fig. 1.

The inner or rightward end portion of the output shaft 15, as shown in Figs. 2 and 3, is connected as by a readily detachable coupling 16 to a stub shaft 17 journaled for angular movement in a branch portion 18 of the cylinder or main casing 10. The support for the stub shaft 17 may include parking latch releasing piston P2 (P2', Fig. 2) which is slidable and has appropriate seals in and against relatively large and small bore portions 19 and 20 of casing branch portion 18 so as to form (e.g. in connection with the bore portion 19) a pressure chamber C2 (or C2'). That pressure chamber, as shown in Fig. 3, communicates freely with the fluid lines 6 and 6' leading to the power piston chamber C. Bore portion 20 of casing branch 18 communicates with a normally closed space D around the power piston and part of the stub shaft 17, which space D is closed and conventionally or suitably sealed except for a one-way or non-return spring loaded valve 21 connected to the motor supply and exhaust conduit 4 for egress of fluid from the space D into the conduit 4 when that conduit is serving as drain for the motor chamber C.

As further shown in Figs. 2 and 3, the power-piston-connected stub shaft 17 is operatively rigid with a cylindrical brake drum 25, shown as constituting an enlarged diameter portion of the stub shaft 17. In axial alignment with the brake drum 25 and carried for example by a removable but normally stationary portion 18a of the branch casing portion 18, is a stationary drum 26, shown in Fig. 2 as comprising an integral portion of threaded cap 18a'. A helical-spring 28 surrounds the stationary drum 26 and is elastically preloaded on the angularly movable drum 25 so as to be self energizing thereagainst for one-way friction braking purposes as well known in spring clutch types of couplings. The coils 27 of the spring 28 are positively connected to the fixed housing portion 18a by an anchor toe 30 or 30' of the spring. The endmost one of the coils 29 of the spring 28 has a releasing lug or toe 32 which, as schematically shown in Fig. 3, is slidably engaged with an axial eccentric bore 33 in a control sleeve or collar 34 for spring 28 around the stub shaft 17 and supported (support not shown in Fig. 3) for angular movement about its axis as well as for limited movement along its axis. The control collar for the helical spring 34 is shown in Fig. 3 as having been moved to the right to a suitable stop (not shown) by operation of the releasing piston P2. During that rightward movement a stationary pin 36 in an inclined cam slot 35 of the control collar 34 causes the collar to be turned in a direction to expand the coils 29 of the helical spring 28, thus releasing the brake and permitting the stub shaft 17 and the wiper-connected shaft 15 to turn freely in either direction. When the releasing piston is permitted to move to the left (see piston P2' Fig 2), the spring control collar 34 (or 34' Fig. 2) is permitted to turn in the opposite direction, thereby to allow the coils 29 to re-engage the drum 25 and prevent angular movement of the shaft 15, hence the connected wiper blade, in one direction or out the desired parking position of the wiper blade if it was in parked position.

In Fig. 2 the basic arrangement for operation of the helical brake spring 28 is operatingly the same as in Fig. 3. However, in Fig. 2 a pair of helical cam slots 35' (corresponding to slot 35 of Fig. 3) are carried by a sleeve or fitting 38 suitably rigid with the housing branch 18 via its cap 18a', and (instead of a fixed pin 36) a pair of pins 36' projecting radially from the axially slidable and angularly movable control collar 34' coact with the fixed helical slots 35'. Fig. 2 further complements Fig. 3 in showing a suitable spring assembly for returning the helical spring control collar 34 or 34' to the left so as to follow up the releasing piston P2 or P2' upon depletion of pressure in its operating pressure chamber C2 or C2'. The return spring assembly comprises, as shown in Fig. 2 only, a shouldered sleeve 40 slidable in a co-acting bore in the cap 18a' and a coil compression spring 41 bearing against a flange or axial shoulder of sleeve 40 for causing the de-energizing sleeve 34' to follow the piston P2' leftwardly. The leftward end of the helical spring coils 29, as shown in Fig. 2, has a radial terminal lug or toe formation 32' slidably along an axial slot 33' in the de-energizing collar 34' as a suitable sliding key connection between the collar 34' and the spring 28.

Fig. 2 also shows a suitable supporting bearing 44 in the housing branch portion 18 around the stub shaft 17 and, at the far right, a similar supporting journal bearing 45 in the fixed drum 26. The rest of the arrangement shown in Fig. 2 (e.g. mounting for shaft 15 and various seals) is either of conventional or already well known construction and believed apparent from inspection of the drawings.

It is important that the latch control piston P2 (or P2') shall be able to move quickly from its helical-spring-releasing position to its opposite position and vice versa at terminal stroke positions of the motor power piston P or whenever fluid pressure reversal via valve unit 5 takes place. Suitable fluid by-passage for equalization of pressure in the space or chamber D2 around the latch mechanism and the space or chamber D around the power piston P between its heads 8 and 9 is enabled by provision of ample clearance (not shown) between the stub shaft 17 and its complementary bores in the piston P2' (Fig. 2) and the supporting bushings for the output shaft 15 and for the stub shaft 17. Pressure in chamber or space D is prevented from becoming great enough to interfere with free movement of the latch control piston P2 (or P2') in the direction to enable re-gripping of the drum 25 by the helical spring 28 at the parking or terminal stroke position of the motor power piston P through operation of the earlier mentioned one-way-operating valve 21, Fig. 3.

*Normal or wiping operation*

Referring especially to Fig. 3 and assuming that power piston P has been moving toward and into engagement with a suitable (e.g. cushion) stop diagrammatically indicated at 48, such operation will have required high or working pressure in chamber C and drain or sump pressure in chamber C'. Thus, under normal high speed operation of the wiper mechanism (e.g. in excess of one hundred strokes per minute) the working pressure in chamber C', hence connected latch control piston chamber C2 will have maintained the helical brake spring 28 released from the drum 25 during the half cycle or stroke just described. As the reversing valve mechanism 5 is operated past dead center (as a function of rise in pressure in chamber C) high pressure will then be established in chamber C' and consequently low pressure in chambers C and C2 such as will allow the helical spring coils 29 to be returned to locking position on the drum 25 as the latch release piston P2 and control collar 34 move to the left. Drum 25, during the ensuing half cycle, will overrun in the helical spring coils 29 until the power piston P has completed its return stroke (downwardly, Fig. 3). When the piston head 9 is stopped by engagement with cushioning abutment 48' and toggling or dead center action of the reversing valve mechanism is occasioned thereby, the high pressure in chamber C, hence latch control piston chamber C2 again moves the latch releasing piston P2 in the direction to de-energize or release the helical spring 28.

*Parking operation*

The parking operation, under control of the operator or attendant, may be initiated and effected by reducing the rate of supply pressure fluid to the motor and automatic reversing valve mechanism 5, Fig. 1, as by manipulation of control valve 1, to slow down the motor or motors M and M'; and then when the wipers arrive at the desired parking position the control valve may be completely closed. Alternatively, or for further example, the fluid admission rate through control valve 1 (while the pistons are slowly moving toward proper stroke terminal positions) can be reduced to the point at which the necessary pressure rise in the motor piston chamber opposite that in which the motor piston is to stop for parking will not be sufficient to operate the reversing valve mechanism to start a new stroke. In that case continued admission of fluid into such opposite chamber can cause beyond-normal-stroke parking positioning of the motor pistons and connected wiper blades as explained in said co-pending Fuller et al. application Serial No. 738,503, and then the control valve is either completely closed (preferred operation) or the control valve can be left slightly open so that a continued slow rate or below threshold admission of pressure fluid will assist in holding the wipers in parked positions.

Specifically, in reference to Fig. 3, parking (e.g. of wiper blade B of Fig. 1) is effected when the motor piston P is at the end of its (shown downward) stroke toward abutment or cushion stop 48'. As the motor piston P has been approaching that abutment or stop the pressure in piston chamber C and line 6, hence parking latch control piston chamber C2, will have been negligible and the latch control piston P2 (or P2') will have been in the position corresponding to that of piston P2' in Fig. 2, so that the helical spring brake mechanism 28 etc., will have been idle. Thus at power piston stroke terminal, when pressure in conduit 4 leading to piston chamber C is reduced to below toggle mechanism operating pressure threshold or is reduced to drain value, the motor pistons P will be blocked against being moved out of parked position by self energized action of the helical brake latching mechanism hereof as hereinbefore described.

What is claimed is:

1. In combination with a reciprocating fluid-operated motor having opposed fluid chambers and having automatic valve mechanism operating alternately to pressurize and exhaust the fluid chambers and an element moved to and fro thereby for operation of a load, an angularly movable member connected for alternate rotary movement by said element, a self eneregized, one-way acting friction brake connected to said member for holding the member from movement out of terminal stroke or other position in one direction, and pressure operated means independent of said element and fluid-connected to one of the motor fluid chambers and operated cyclically thereby to move the brake to releasing position during return stroke movements of said element and member.

2. In combination with a reciprocating fluid-operated motor having alternately and cyclically pressurized fluid chambers and an element moved automatically to and fro thereby for operation of a load, an angularly movable member connected for alternate rotary movement by said element, a self energized, one-way-acting helical spring friction brake having free end coils normally in gripping relation to a circular drum connected to said member for restraining the member against movement out of terminal stroke or other position in one direction, and pressure operated means fluid-connected to one of the motor fluid chambers and torque-connected to one of the free end coils for operation in a direction to hold the brake in released condition during return stroke movements of said element and member.

3. In a reciprocating fluid operated windshield wiper motor having alternately pressurized fluid chambers and a power piston moved to and fro thereby, an angularly movable output shaft for operation of a wiper and connected to be oscillated by movements of the power piston, a generally circular drum connected to the output shaft for movement therewith, a casing for the motor, a helical friction spring connected at one end to the casing and having coils at its opposite end in self energizing contact with the drum, a spring control piston slidable along the axis of the output shaft, a chamber for the control piston in the casing, conduit means connecting that chamber with one of the pressure chambers of the motor or to a fluid supply line therefor, means operatingly connecting the spring control piston with one of said opposite end coils of the spring in a manner to release the spring from gripping contact with the drum for permitting angular movement of the output shaft in one direction, and biasing means operating during depletion of pressure in the releasing piston chamber for returning the releasing piston into a position enabling regripping of the drum by said opposite end coils of the spring.

4. Mechanism according to claim 2 wherein said means operatingly connecting the spring control piston with the helical spring comprises a pin element movable along a generally helical slot element, one element being fixedly carried by the motor casing and the other element being carried by an angularly movable control collar coaxial with the helical spring and connected thereto, and means guiding the collar for axial movement by the spring control piston.

5. Mechanism according to claim 2, wherein the operating connection between the releasing piston and the helical spring comprises a generally helical cam slot fixedly carried by the motor casing, a collar torque-connected with the spring, slidable along the axis of the drum and angularly movable about that axis, and a pin carried by the collar and occupying the slot for angular movement thereby in a direction to de-energize said opposite end coils of the spring.

References Cited in the file of this patent
UNITED STATES PATENTS

| | | |
|---|---|---|
| 2,220,599 | Galter | Nov. 5, 1940 |
| 2,681,581 | Pearson | June 22, 1954 |
| 2,735,029 | Dyer et al. | Feb. 14, 1956 |